(No Model.)
M. J. STAFFORD.
ATTACHMENT FOR PLOWS.
No. 299,868. Patented June 3, 1884.
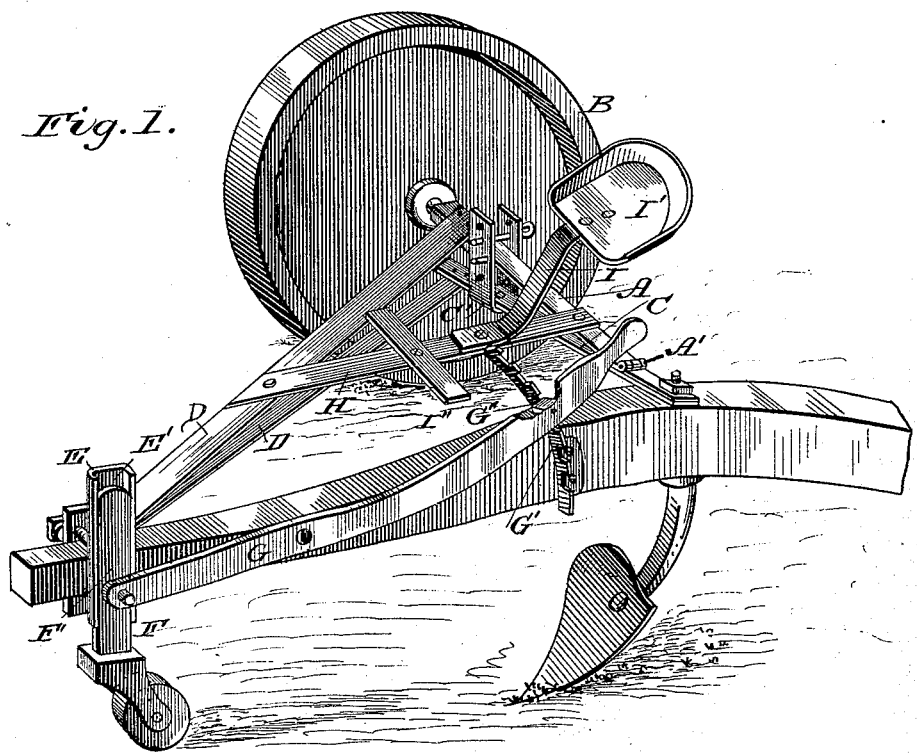
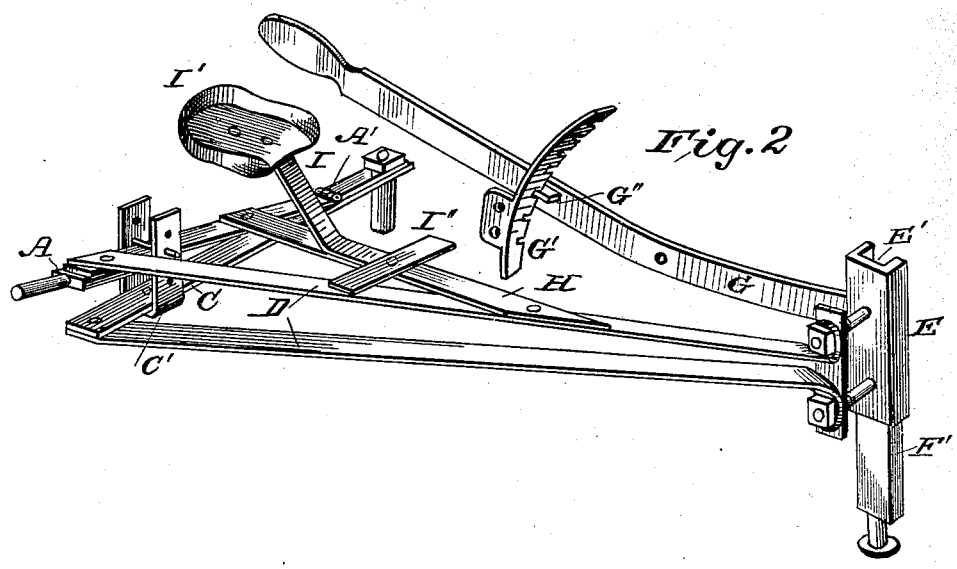
WITNESSES:
Fred. G. Dieterich
J. Fred. Reily
INVENTOR.
Mahlon J. Stafford
By Louis Bagger & Co.
ATTORNEYS.

UNITED STATES PATENT OFFICE.

MAHLON J. STAFFORD, OF WHEATLAND, INDIANA.

ATTACHMENT FOR PLOWS.

SPECIFICATION forming part of Letters Patent No. 299,868, dated June 3, 1884.

Application filed March 15, 1884. (No model.)

*To all whom it may concern:*

Be it known that I, MAHLON J. STAFFORD, a citizen of the United States, and a resident of Wheatland, in the county of Knox and State of Indiana, have invented certain new and useful Improvements in Attachments for Plows; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved attachment for plows, showing the same attached in operative position to a plow of ordinary construction; and Fig. 2 is a similar view of the attachment removed from the plow.

Similar letters of reference indicate corresponding parts in both the figures.

My invention consists in the improved construction and combination of parts of a riding attachment for plows, as will be hereinafter more fully described, and particularly pointed out in the claim.

In the accompanying drawings, A represents the main axle of the attachment, upon the outer extremity of which is secured the main wheel B. Beneath this axle extends a second axle, C, provided near its outer end with a vertical bearing, C', within which moves adjustably the outer portion of the main axle A, which is provided at a point near where it joins the plow-beam with a hinge or joint, A', for the purpose hereinafter specified. The outer ends of both of the axles A and C are connected to the front end of the attachment-frame by connecting brace-rods D D.

Upon the front end of the attachment-frame is secured a vertical bearing, E, provided with a vertical groove or recess, E', within which slides adjustably the standard of a caster or roller, F. To the said standard F' is pivotally secured the forward end of a lever, G, adapted to be pivoted at about its center to the side of the plow-beam, and provided at its rear end with a lug or projection, G", adapted to engage with the teeth of a curved rack, G', which is also secured upon the side of the plow-beam. By this arrangement the position of the small caster or roller F with relation to the forward end of the plow-beam may be regulated at the will of the operator. A cross-piece, H, extending from the main axle to the brace-rod of the same, serves to support the seat-spring I, seat I', and foot-rest I".

The object of constructing the main axle with a hinge, A', is to admit of the said axle being adjusted in the vertical bearing C', according to the height of the plow upon which the attachment is being used, for the purpose of keeping the main wheel and the portion of the frame upon which the driver's seat is secured perfectly level or parallel with the surface of the ground. The brace-rod of the main axle is made of sufficient elasticity to admit of these movements.

From the foregoing description, taken in connection with the accompanying drawings, the construction of my improved riding attachment for plows will readily be understood without requiring further explanation.

It will be seen that my improvement is simple in construction, and, being devoid of all complicated parts, is not liable to break or get out of order.

By the use of this attachment land may be plowed which it would otherwise be impossible to break with the same plow.

Having thus described my invention, I claim and desire to secure by Letters Patent of the United States—

As an improvement in attachments for plows, the combination of an auxiliary axle provided with a vertical bearing and having its outer extremity connected to the front portion of the attachment-frame by means of a suitable connecting brace or rod, a main hinged axle, upon the outer end of which the main wheel of the attachment is secured and adapted to be adjusted vertically in the vertical bearing of the auxiliary axle of the attachment, and a caster or roller of suitable size, the standard of which slides in a vertically-recessed bearing on the front end of the attachment-frame, and which is provided with a pivoted operating-lever having secured upon it, near its rear end, a lug or projection adapted to engage with the teeth of a suitable curved rack secured upon the side of the plow-beam, all constructed and arranged to operate substantially in the manner and for the purpose shown and described.

In testimony that I claim the foregoing as my own I have hereunto affixed my signature in presence of two witnesses.

MAHLON J. STAFFORD.

Witnesses:
JOHN HUMPHERY,
WILLIAM ZIEGLER.